March 1, 1955 K. MICHAELIS 2,702,942
BUTTER DISPENSER
Filed Aug. 28, 1952
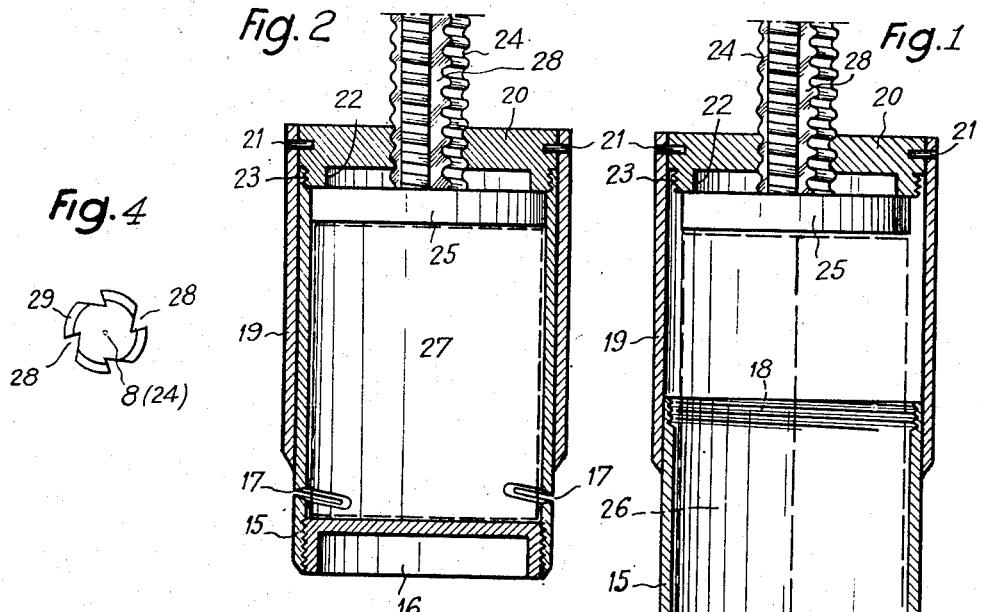
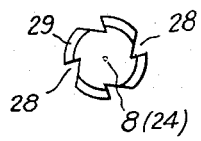
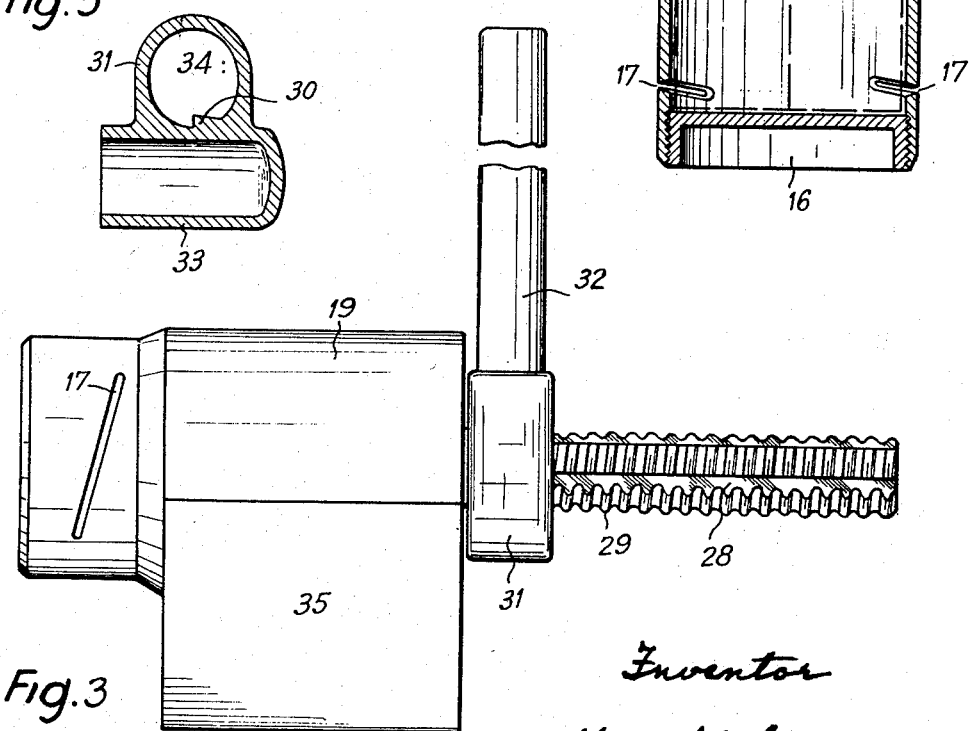
Inventor
Karl Michaelis United States Patent Office 2,702,942
Patented Mar. 1, 1955

2,702,942
BUTTER DISPENSER

Karl Michaelis, The Hague, Netherlands

Application August 28, 1952, Serial No. 306,857

2 Claims. (Cl. 31—1)

This invention relates to apparatus for softening low-cooled butter or other edible fats by extrusion through narrow slots.

The size of about 4¾ in. by 1¼ in. square of the average piece of a quarter pound of butter sold throughout the Eastern States plus the length of more than 5 in. of a screw spindle required for extruding such a prism resulted in an overall length of the extruder of more than 12 inches.

It is an object of this invention to reduce the size of such apparatus.

I achieve this by compacting the bar or prism of butter to be extruded so as to reduce its length while enlarging its cross-section, however limiting this enlargement in correspondence to the pressure which can be set up in the interior of the extruder by the pressure producing means employed. Since the pressure required to force low-cooled butter through narrow apertures varies between 5 and 20 lbs./sq. in., according to the cooling temperature, and since an extruder made of a plastic substance, in view of the cost of production and for other reasons, cannot be made sufficiently strong to resist materially higher pressures, the increase in cross-section of the compacted body of butter should be kept as low as possible.

The means for so compacting the bar or prism of butter sold by the grocers should also be simple and efficacious.

Since a change in the form and volume of the bar or prism of butter must be brought about anyway, it appears indicated to turn the quadrangular butter prism sold in the Eastern States into the form of a cylinder or tube as the most uniform body as regards distribution of pressure.

In the drawings affixed to this specification and forming part thereof an embodiment of a device for first compacting and then extruding the butter is illustrated diagrammatically by way of example.

In the drawings:

Fig. 1 is an axial section of the device with the butter bar filled in, while

Fig. 2 is a similar view of the device ready for storing in the refrigerator.

Fig. 3 is a side elevation of the device in the position it occupies during the extrusion of butter.

Fig. 4 is an end view of the screw spindle, and

Fig. 5 is an axial cross-section of a pawl member adapted for cooperation with such a spindle.

I prefer employing a cylinder in two parts having a diameter slightly greater than the diagonal connecting two opposite corners of the cross-section of the butter prism, one of the two parts being adapted to house a quarter-pound of butter. This cylinder will have a length in the neighborhood of 2½ in. Extrusion of the butter will require a screw spindle 3½ in. in length so that the cylinder and the spindle protruding from it will have a maximum overall length of less than 6½ in.

Referring to the drawings, 15 is the compacting and length-reducing cylinder, 16 is a bottom connected to it by screwing, 17 are two slots, one on each side of the casing. 18 are screw threads on the top end of its inner walls.

19 is the outer cylinder, which embraces the cylinder 15 and has the head 20 fixed to it. 22 is a flange depending from the bottom face of the head, its outer wall being screw-threaded at 23 to fit the inner screw thread 18 of the cylinder 15.

24 is the lower end of a screw spindle, 25 the piston fitting the inner wall of the cylinder 15.

26 indicates a 4¾ in. long butter bar. In order to reduce its length, the butter bar is crushed in the cylinder by placing the cylinder on a table or against a wall and forcing the cylinder 19 down by applying pressure on the head 20.

27 indicates the butter filling the cylinder 15.

When the compacting cylinder 15 has been forced into the outer cylinder 19, it is turned around its axis to engage with its threaded portion 18 the screw thread 23 on the head flange. The two cylinders now are firmly connected with each other and the piston 25 has entered the cylinder 15 and can be brought to bear on the top of the butter body 27 and to extrude butter through the slots 17 in the form of thin soft bands.

Experience has shown that the butter, when first forced into the cylinder 15, has no tendency to escape through the narrow slots.

The ratchet device, which forces the piston down into the casing, consists of the screw spindle 24 formed with longitudinal grooves 28 of triangular cross-section which intersect the screw threads 29 and can be acted upon by a tooth 30 in a ring-shaped pawl member 31 entering the nearest one of the grooves to turn and advance the spindle, when the pawl member is moved forth and back by means of a lever 32 inserted in the sleeve 33 fixed to the pawl 31. The cavity 34 of the pawl member has the form of an ellipse whose greater diameter is somewhat longer than the distance between the tooth and the wall opposite to it.

The extruding device may be supported during the extruding operation by suitably formed feet 35 as shown in Fig. 3, with the mouthpiece extending above the rim (not shown) of a dish, on which the thin bands of butter issuing from the slots 17 can settle down.

I wish it to be understood that I do not desire to be limited to the details described in the foregoing specification and illustrated in the drawings, for obvious modifications will occur to a person skilled in the art.

I claim:

1. Butter extruder comprising in combination, a first tube having an inner diameter greater in length than the greatest width of a commercial butter prism, a second tube having an inner diameter slightly larger than the outer diameter of said first tube and being capable of sliding on it, a head on said second tube and means on said head connectable to one end of said first tube, a nut formed in said head, a screw spindle extending through said nut, a piston fitting in said first tube, a slot formed on said first tube and means for advancing said screw spindle in said first tube in contact with said piston.

2. Butter extruder comprising in combination, a first tube and a second tube, said first tube being dimensioned to fit, and telescope in contact with, the inner wall of said second tube, means for fixing said first tube in position in said second tube with part of it protruding from said second tube, a slot formed in the protruding part of said first tube, a head secured on said second tube, a nut formed in said head, a screw spindle extending through said nut and a piston fitting in said first tube and contacting the end of said spindle and means for turning said spindle to make it advance and push said piston toward said slot.

References Cited in the file of this patent

UNITED STATES PATENTS

| | | |
|---|---|---|
| 633,865 | Linkiewicz | Sept. 26, 1899 |
| 1,260,162 | Dorsey | Mar. 19, 1918 |
| 2,596,018 | Fishburne et al. | May 6, 1952 |

FOREIGN PATENTS

| | | |
|---|---|---|
| 19,804 | Sweden | July 18, 1904 |
| 280,852 | Germany | Nov. 30, 1914 |
| 514,618 | Great Britain | Nov. 14, 1939 |